United States Patent [19]

Kamiyama et al.

[11] Patent Number: 5,718,993
[45] Date of Patent: Feb. 17, 1998

[54] INFORMATION RECORDING MEDIUM

[75] Inventors: Hironori Kamiyama; Tomoyuki Idehara; Hironori Kobayashi, all of Tokyo, Japan

[73] Assignee: Dai Nippon Printing Co., Ltd., Tokyo, Japan

[21] Appl. No.: 692,131

[22] Filed: Aug. 5, 1996

[30] Foreign Application Priority Data

Aug. 10, 1995 [JP] Japan ................... 7-204739

[51] Int. Cl.$^6$ .................................. G11B 7/24
[52] U.S. Cl. .................. 430/20; 430/31; 430/48; 349/89
[58] Field of Search ..................... 430/20, 495.1, 430/945, 31, 48; 349/89

[56] References Cited

U.S. PATENT DOCUMENTS 5,514,504  5/1996  Iijima et al. ................. 430/20

FOREIGN PATENT DOCUMENTS 1-153472  6/1989  Japan.

*Primary Examiner*—John A. McPherson
*Attorney, Agent, or Firm*—Sughrue, Mion, Zinn, Macpeak & Seas, PLLC

[57] ABSTRACT

An information recording medium having an information recording layer comprising a liquid crystal phase and a resin phase is protected against deterioration due to a long-term storage. An information recording medium having an information recording layer comprising a liquid crystal phase and a resin phase and located in opposition to a photoelectric sensor having a photoconductive layer has been packed in a moisture- and light-resistant laminate formed of a synthetic resin and an aluminum foil, and filled therein with a dried, moisture-free inert gas.

4 Claims, No Drawings

INFORMATION RECORDING MEDIUM

BACKGROUND OF THE INVENTION

The present invention relates generally to an information recording medium having an information recording layer comprising a liquid crystal phase and a resin phase, which is located in opposition to a photoconductive layer having a conductivity varying upon exposure to optical information, and more particularly to an information recording medium which is usable even after a long-term storage.

Applicant has already filed patent applications typically represented by JP-A-5-165005 and JP-A-6-130347 to propose information recording media in which an information recording layer opposing to a photoconductive layer is stacked on an electrode, wherein the aforesaid information recording layer is formed of a liquid crystal-polymer composite composed of a resin phase and a liquid crystal phase, said resin phase being formed of an ultraviolet-curing resin to achieve a structure in which ultraviolet-curing resin particles are filled and dispersed throughout the liquid crystal phase, and a surface of the aforesaid information recording layer is formed by a skin layer of an ultraviolet-curing resin.

Applicant has filed Japanese Patent Application No. 6-119053 to propose an information recording system having an information reproducing section to reproduce information from the information recording system upon recorded, and has proposed an information recording system having a mechanism to erase the recorded information by heating as well. Moreover, applicant has filed patent applications including Japanese Patent Application No. 6-6437 to propose a photoconductive layer for these information recording media.

The aforesaid information recording layer, because of having a surface formed of a resin layer alone, prevents any bleeding of liquid crystals, and enables a photoelectric sensor to be used to record information in a noiseless way.

In these information recording media wherein, as set forth in the aforesaid prior specifications, the photoconductive layer which manifests conductivity upon exposure to optical information is located in opposition to the information recording layer, information is recorded by an electric field produced by the application of voltage between an electrode of the photoconductive layer and an electrode stacked on the information recording layer. Thus, they are free from such problems as arising with general photographic film upon exposure to light. Grave problems with them are, however, that their characteristics become unstable upon exposure to light and prolonged exposure to an air atmosphere having high humidity.

An object of the present invention is to eliminate the unstableness of such an information recording medium by the provision of an improved information recording medium which has been subjected to moisture- and light-resistant treatments.

SUMMARY OF THE INVENTION

The present invention provides an information recording medium having an information recording layer comprising a liquid crystal phase and a resin phase, in which an electrode stacked on said information recording layer is located in opposition to a photoelectric sensor having a photoconductive layer, and the photoconductive layer is exposed to light while voltage is applied between the electrode on said information recording layer and the electrode on said photoconductive layer, so that information can be recorded in said information recording medium by a produced electric field, said information recording medium having been hermetically packed in a moisture- and light-resistant package material having an inert gas filled therein, thereby preventing any possible degradation of said information recording medium due to humidity, etc. during storage.

DESCRIPTION OF THE PREFERRED EMBODIMENTS

When the information recording medium according to the present invention degrades due to humidity, etc., that is, the photoconductive layer thereof absorbs moisture, there is an increase in a dark current passing through it. To be more specific, when a voltage of 15 V/µm is applied to the photoconductive layer alone, the resultant dark current value exceeds a proper value that lies in a range of 2 to $5 \times 10^{-6}$ $A/cm^2$, at which the information recording medium has difficulty in functioning as an information recording system. An object of the present invention is to provide a solution to this problem, thereby achieving an information recording medium having good-enough operating performance.

The moisture- and light-resistant material used herein may be a film having moisture- and light-resistant functions. However, it is preferable to laminate aluminum on such a film. For instance, it is desired to use a laminate comprising aluminum, nylon and the like such as one comprising nylon/polyacrylic acid/aluminum foil/polyacrylic acid/low-molecular-weight polyethylene.

For the gas to be filled in the package material it is preferable to use an inert gas, for instance, nitrogen or argon. However, dried air may also be used.

The package, if a desiccant such as silica gel, an oxygen remover (such as Ageless made by Mitsubishi Gas Chemical Company, Inc.) and the like are incorporated therein, can enhance the packaging effect of the moisture- and light-resistant material and keep it for an extended period of time.

The present invention will now be explained with reference to examples and one comparative example.

EXAMPLE 1

Preparation of Photoconductive Layer

An ITO film of 100 nm in thickness was formed on a fully washed glass substrate of 1.1 mm in thickness by means of sputtering to obtain an electrode layer of 80 Ω/□. Coated on that electrode was a charge generation agent in the form of a bis-azo dye type of coating solution (DPDD-3 made by Dainichi Seika Kogyo Co., Ltd.) using a blade coater, followed by drying at 100° C. for 1 hour, so that a 300-nm thick charge generation layer was stacked thereon. Coated on this charge generation layer was a charge transport agent in the form of a hydrazone type of coating solution (DPDT-3 made by Dainichi Seika Kogyo Co., Ltd.) using a spinner, followed by drying at 80° C. for 2 hours, so that a 10-µm thick photoconductive layer comprising the charge generation and transport layers was obtained.

Preparation of Intermediate Layer

One (1) gram of a perfluoro resin (AF-1600 made by Du Pont) was dissolved in 99 grams of a fluorine type solvent (FC-40 made by Sumitomo 3M Co., Ltd.) to form an intermediate layer solution, which was then coated on the previously prepared photoconductive layer by means of a spinner, followed by drying at 80° C. for 1 hour, so that an intermediate layer of 0.2 μm in film thickness was obtained. This layer was found to have a surface good-enough to make not attack on the photoconductive layer.

Coated on this layer was a silane coupling agent (P-600 made by Asahi Glass Co., Ltd.) at a thickness of 0.1 μm by means of a spinner, followed by drying at 80° C. for 1 hour.

Preparation of Information Recording Layer

| | |
|---|---|
| Smectic liquid crystal MJ941408 (made by Merck & Co., Inc.) | 11 parts |
| Ultraviolet-curing prepolymer MPL-410 (made by Nippon Kayaku Co., Ltd.) | 9 parts |
| Photopolymerization initiator Darocure 1173 (made by Ciba-Geigy AG) | 0.45 parts |
| Surfactant Florado FC-430 (made by Sumitomo 3M Co., Ltd.) | 0.2 parts |

These components were adjusted to a solid content of 50% by weight with xylene. Then, the resultant solution was coated on an information recording medium by means of a spinner, held at 47° C., and irradiated with ultraviolet radiation at 500 mJ/cm$^2$ to obtain an information recording layer.

From the observation of sections of liquid crystals extracted from the obtained information recording layer under a scanning electron microscope, it was found that the information recording layer is covered thereon with the resin, and filled therein with resin particles having submicron diameters.

Then, ITO was formed on the information recording layer by means of sputtering to complete an information recording medium.

Measurement of Dark Current Value

The photoconductive layer was removed from the information recording medium, and a gold electrode of 4 mm in length and width was formed on the charge transport layer by evaporation. While light was shut off, a voltage of 15 V was applied between the electrode previously formed on the photoconductive layer and the gold electrode formed by evaporation to measure a current passing therebetween, which is herein called a dark current.

Packaging

In a dark place and in an atmosphere of 25° C. and 60% RH, the obtained information recording medium was enclosed in a bag composed of a moisture- and light-resistant film formed of a 10-μm thick nylon, a 9-μm thick aluminum foil and a 13-μm thick polyethylene which were laminated together using polyacrylic acid adhesive layers, and the bag was then thermally sealed by means of a heat sealer for the purpose of storage.

Estimation of Dark Current Value

The bag was unpacked, immediately after which the dark current flowing through the photoconductive layer of the information recording medium was measured. For an information recording medium which had been kept unpacked in an atmosphere of 25° C. and 75% RH for 4 hours, the dark current value increased to 6.0×10$^{-6}$ A/cm$^2$ at which no good recording was possible. For the packaged information recording medium, on the other hand, the dark current value was kept constant at 2.8×10$^{-6}$ A/cm$^2$ even after the lapse of 30 days, at which recording was possible.

Recording of Image

After stored in an environment of 25° C. and 75% RH for 30 days, the information recording medium package was unpacked, just after which a gray scale was exposed to projection light for 33 msec from the photoconductive layer side, and a voltage of 500 V was applied between the electrodes for 40 msec. Subsequent observation of the information recording medium indicated that the transmittance of the information recording layer changes corresponding to the transmittance of the gray scale, and that images are well recorded.

Reading of Image

The recorded image was read with 488 nm light. After A/D conversion, the standard deviation was found to be 3.0 at a density portion of 100 on a 256-gradation scale, indicating that the image read is of good-enough graininess.

EXAMPLE 2

The information recording medium obtained in Example 1 was placed in the moisture- and light-resistant film of Example 1, the interior of which was fully replaced by a nitrogen atmosphere within a container filled therein with nitrogen of 25% RH, and the film was then sealed by means of a heat sealer.

Estimation of Dark Current Value

The package was unpacked, just after which a dark current passing through the photoconductive layer of the information recording medium was measured. Even after the lapse of 30 days, the dark current value was kept constant at 2.2×10$^{-6}$ A/cm$^2$, at which recording was possible.

Recording of Image

After stored for 30 days, the information recording medium package was unpacked, just after which a gray scale was exposed to projection light for 33 msec from the photoconductive layer side, and a voltage of 490 V was applied between the electrodes for 40 msec. Subsequent observation of the information recording medium indicated that the transmittance of the information recording layer changes corresponding to the transmittance of the gray scale, and that images are well recorded.

EXAMPLE 3

The information recording medium fabricated in Example 1 was placed in an information recording medium unit composed mainly of an acrylic resin and having a taking lens, which was then packed as in Examples 1 and 2. After the lapse of 30 days, information could likewise be recorded on the information recording medium upon unpacking.

COMPARATIVE EXAMPLE 1

After stored at 25° C. and 75% RH for 1 month, the information recording medium fabricated in Example 1 was used for recording information as in Example 1. However, the information recorded was found to have no contrast. Then, the thus recorded image was read with a scanner using 488 nm light for image processing. After A/D conversion, the standard deviation was found to be 6.6 at a density portion of 100 on a 256-gradation scale, indicating that the image is poor in graininess.

As can be understood from the foregoing, the information recording medium according to the present invention is not adversely affected in terms of its characteristics by environmental conditions inclusive of humidity during storage, and so can yield images of good quality ever after a long-term storage.

What we claim is:

1. An information recording medium comprising an electrode layer, a photoconductive layer, an intermediate layer, an information recording layer composed of a liquid crystal phase and an ultraviolet-curing resin phase, and an electrode layer in the described order, characterized by having been hermetically enclosed in a packaging bag formed of a moisture- and light-resistant material.

2. An information recording medium comprising an electrode layer, a photoconductive layer, an intermediate layer, an information recording layer composed of a liquid crystal phase and an ultraviolet-curing resin phase, and an electrode layer in the described order, characterized by having been enclosed in a unit having a recording function, said unit having a recording function having been enclosed in a packaging bag formed of a moisture- and light-resistant material.

3. The information recording medium according to claim 1, characterized in that said moisture- and light-resistant packaging bag has been filled therein with an inert gas.

4. The information recording medium according to claim 2, characterized in the said moisture- and light-resistant packaging bag has been filled therein with an inert gas.

* * * * *